United States Patent
Wei et al.

(10) Patent No.: US 8,982,093 B2
(45) Date of Patent: Mar. 17, 2015

(54) CAPACITIVE TOUCH SENSING SYSTEM WITH INTERFERENCE REJECTION

(71) Applicants: Guo Wen Wei, San Jose, CA (US); Tom W. Kwan, Cupertino, CA (US)

(72) Inventors: Guo Wen Wei, San Jose, CA (US); Tom W. Kwan, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 93 days.

(21) Appl. No.: 13/754,632

(22) Filed: Jan. 30, 2013

(65) Prior Publication Data
US 2014/0176482 A1    Jun. 26, 2014

Related U.S. Application Data

(60) Provisional application No. 61/739,774, filed on Dec. 20, 2012.

(51) Int. Cl.
| G06F 3/045 | (2006.01) |
| G06F 3/041 | (2006.01) |
| G06F 3/044 | (2006.01) |

(52) U.S. Cl.
CPC .............. *G06F 3/044* (2013.01); *G06F 3/0418* (2013.01)

USPC .......................................... 345/174; 178/18.02

(58) Field of Classification Search
USPC ......................................................... 345/174
See application file for complete search history.

(56) References Cited

U.S. PATENT DOCUMENTS

| 2011/0199331 A1* | 8/2011 | Otagaki et al. ................. 345/174 |
| 2011/0273400 A1* | 11/2011 | Kwon et al. .................... 345/174 |
| 2012/0256869 A1* | 10/2012 | Walsh et al. .................... 345/174 |
| 2014/0145997 A1* | 5/2014 | Tiruvuru, Rajesh ............ 345/174 |

* cited by examiner

*Primary Examiner* — Charles V Hicks
(74) *Attorney, Agent, or Firm* — Garlick & Markison; Randy W. Lacasse

(57) ABSTRACT

An interference tolerant capacitive touch sensor readout circuit having improved power and area efficiency is disclosed. Interference rejection for the capacitive touch sensing system is realized by transferring charge between a capacitive touch sensor and the readout circuit at frequencies outside bands where a level of interference is unacceptable. Improved power and area efficient come from the simplicity of the readout circuit which comprises a switched-capacitor integrator, a comparator, a digital accumulator and number of switches for driving a touch sensor and a capacitive feedback loop. The readout circuit is capable of interfacing with both self and mutual capacitance sensor to achieve compatibility with a larger collection of sensors and provides additional sensing and diagnostic functionalities.

18 Claims, 5 Drawing Sheets

CAPACITIVE TOUCH SENSING SYSTEM WITH INTERFERENCE REJECTION

REFERENCE TO RELATED APPLICATION

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:

1. U.S. Provisional Application Ser. No. 61/739,774 entitled "Capacitive Touch Sensing System With Interference Rejection," filed Dec. 20, 2012.

BACKGROUND OF THE INVENTION

1. Technical Field of the Invention

This technology described herein relates generally to capacitive touch sensors and more particularly to circuits used to support capacitive touch sensors.

2. Description of Related Art

Various methods exist for detecting user interactions with a touch screen. Many of these utilize sensors whose electrical properties change when touched. Capacitive touch screens employ capacitive sensors for touch detection. Touching the screen in a specific area changes the amount of capacitance at that location which the system detects and after processing extracts as a user input.

Generally, capacitive touch sensors are capacitors with loosely confined electric fields purposely projected in ways that make their capacitance sensitive to touch. As a finger approaches a capacitive touch sensor, it intersects with the projected electric field lines causing the sensor capacitance to change. The amount of capacitance change depends on the quantity of field lines crossed. Therefore, the closer a finger is to a touch sensor the greater the changes in the sensor capacitance.

Usually, touch sensing is performed using either self or mutual capacitance sensors. In self-capacitance, the capacitive sensor is formed between a relatively small conductive layer and the much bigger sensor ground plane. In mutual capacitance, the capacitive sensor is formed between two conductive layers typically similar in size and neither assigned to any fixed voltages. Unlike self-capacitive sensors where only one electrode is accessible (i.e., available to make connection to other circuit elements), in mutual capacitive sensors both electrodes are accessible.

Often, touch sensing systems are designed to interface with either self or mutual capacitive sensors. Systems having the capability to sense both mutual and self-capacitance are less prominent as they often incur significant power and area overheads.

Another challenge in capacitive touch sensing is interference rejection. Capacitive touch sensors pick up both touch signals and additive interference. The frequency content of the two might overlap or can be too close to each other for direct filtering to be practical. Typically, capacitive touch sensing systems employ amplitude modulation to up-convert touch signals to a frequency band where they can be easily separated from interference using frequency selective filtering to achieve relatively error free touch detection.

FIG. 1 provides an example capacitive touch sensor circuit 100 with interference rejection. Touch sensor 103 receives a generated analog carrier signal (sine wave) to up-convert touch input signals generated when sensor 103 is touched. Specifically, waveform generator 101 generates a digital waveform which is then converted to analog by digital-to-analog converter (DAC) 102. The carrier frequency is selected such that the up-converted touch signal falls in a frequency range with low interference levels. The up-converted touch signals along with interference feed into trans-impedance amplifier 104 and subsequently pass through analog-to-digital converter (ADC) 105. The digital signals are demodulated at 106 using the digital carrier signal from waveform generator 101 and are fed into digital low pass filter (digital LPF) 107 for frequency selective filtering to remove interference. Data results (Data<N-1:0>) representing sensor capacitance values are output from the digital LPF and undergo further signal processing steps (not shown) to extract touch events. Although good interference rejection is achieved with such systems, dedicated digital-to-analog and analog-to-digital converters in addition to non-trivial digital signal processing blocks are required. These requirements increase the complexity of such systems making them less suitable for applications where low power and small area are necessary. Therefore, a need exists to provide a capacitive touch sensor having good interference rejection for low power and small area applications. Although there are many power and area efficient ways to sense capacitance, these schemes are usually inaccurate when interferers are present.

Disadvantages of conventional approaches will be evident to one skilled in the art when presented in the disclosure that follows.

BRIEF SUMMARY OF THE INVENTION

The technology described herein is directed to a method and apparatus that are further described in the following Brief Description of the Drawings and the Detailed Description of the Invention. Other features and advantages will become apparent from the following detailed description made with reference to the accompanying drawings.

BRIEF DESCRIPTION OF THE SEVERAL VIEWS OF THE DRAWING(S)

DETAILED DESCRIPTION OF THE INVENTION

A switched capacitor is an electronic circuit element used for discrete time signal processing. It works by moving charges into and out of capacitors when switches are opened and closed. Usually, non-overlapping signals are used to control the switches, so that not all switches are closed simultaneously. The operations of switched capacitor circuits can be described mathematically using difference equations with corresponding frequency domain transfer functions. One or more of the following embodiments will include circuits using switched capacitance circuits.

Figure 1:
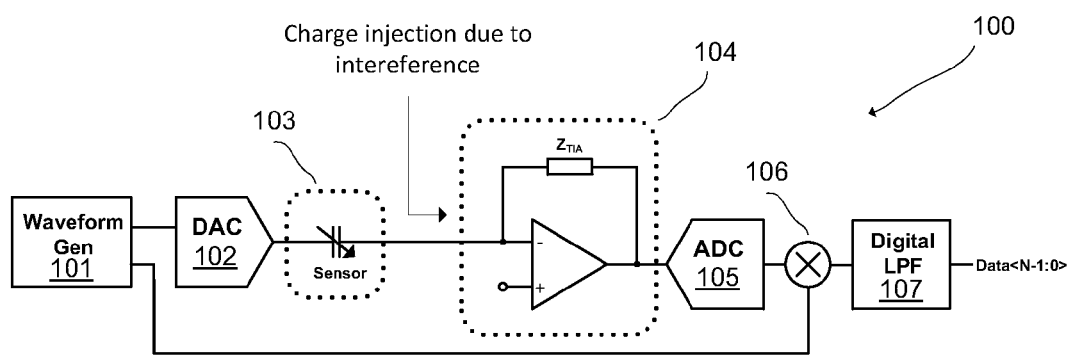
FIG. 1 illustrates prior art circuitry for a capacitive touch sensor.
Figure 2:
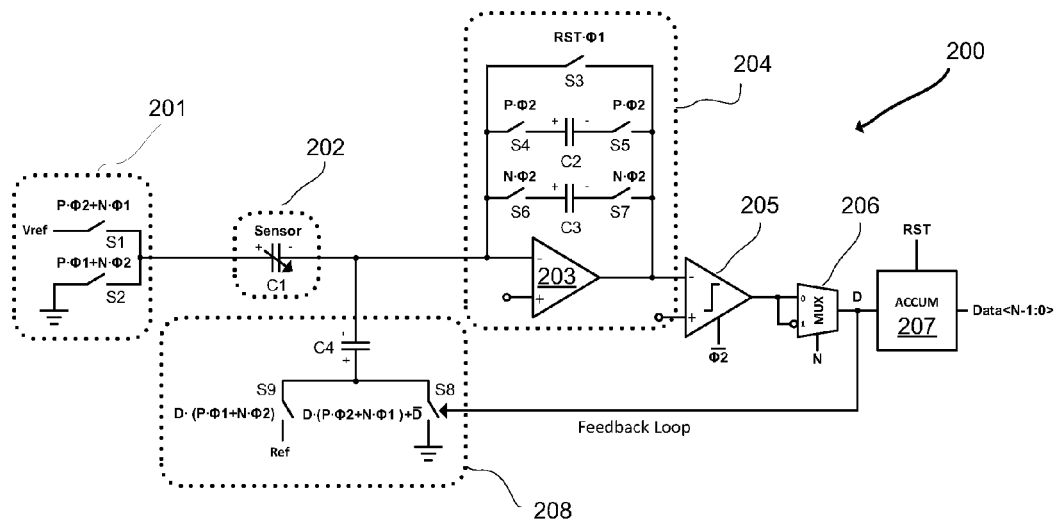
FIG. 2 illustrates a circuit layout for one embodiment of a mutual capacitive touch sensor.

FIG. 2 illustrates one embodiment of a circuit 200 for capturing mutual capacitive touch sensor 202 inputs with interference rejection in accordance with the technology described herein. In particular, a circuit layout is shown that accomplishes capacitive touch sensing and interference rejection using a minimal amount of circuitry and digital logic. Capacitive touch sensor 202 including at least variable capacitor C1 is connected as the input capacitor to switched-capacitor integrator 204. Charge transfer between sensor 202 and switched-capacitor integrator 204 occurs every clock period during a conversion cycle (i.e., multiple clock periods) and alternates in phase between positive (P) and negative (N) from one clock period to another. In the positive phase, driver (driving signal generator) 201 using, for example, a square wave causes voltage at the positive terminal of capacitive touch sensor 202 to change by Vref while capacitor C2 is connected across the inverting and output terminals of operational amplifier 203, thereby forcing charge to flow from capacitive touch sensor 202 into capacitor C2. To affect the voltage change, driver 201 first closes switch S2 and opens switch S1 during Φ1, then opens switch S2 and closes switch S1 during Φ2. Capacitor C2 is connected across operational amplifier 203 by closing switches S4 and S5 during Φ2. During Φ1 switches S4 and S5 are open, and to maintain virtual ground at the inverting input of operational amplifier 203, switch S3 is always closed during Φ1. The remaining switched-capacitor integrator 204 switches S6 and S7 are always open in the positive phase because capacitor C3 is used only in the negative phase. Each time a charge transfer occurs in the positive phase, the voltage across capacitor C2 increases (i.e., more positive) which in turn causes switched-capacitor integrator 204 output voltage to drop towards the negative supply. Over the duration of a conversion cycle, as charge transfers occur repeatedly, switched-capacitor integrator 204 output voltage will ramp-down towards the negative supply during the positive phase.

Relative to the positive phase, charge transfer happens in the reverse direction during the negative phase. Here, driver 201 cause voltage at the positive terminal of capacitive touch sensor 202 to change by −Vref while capacitor C3 is connected across the inverting and output terminals of operational amplifier 203, thereby forcing charge to flow from capacitor C3 into capacitive touch sensor 202. To affect the voltage change, driver 201 first closes switch S1 and opens switch S2 during Φ1, then opens switch S1 and closes switch S2 during Φ2. Capacitor C3 is connected across operational amplifier 203 by closing switches S6 and S7 during Φ2. During Φ1 switches S6 and S7 are open, and to maintain virtual ground at the inverting input of operational amplifier 203, switch S3 is always closed during Φ1. The remaining switched-capacitor integrator 204 switches S4 and S5 are always open in the negative phase because capacitor C2 is used only in the positive phase. Each time a charge transfer occurs in the negative phase, the voltage across capacitor C3 decreases (i.e., more negative) which in turn causes switched-capacitor integrator 204 output voltage to jump-up towards the positive supply. Over the duration of a conversion cycle, as charge transfers occur repeatedly, switched-capacitor integrator 204 output voltage will ramp-up toward the positive supply during the negative phase.

Comparator 205 is used to determine whether charge (absolute value) held in capacitors C2 or C3 has exceeded a predetermined threshold. In operation, it outputs logic 1 if switched-capacitor integrator 204 output voltage at the end of Φ2 is greater than a reference level, and logic 0 otherwise. In the positive phase when enough charge is accumulated (in the positive direction) on C2, switched-capacitor integrator 204 output voltage drops below comparator 205 reference voltage level causing comparator 205 to output logic 1. When this happens, feedback-DAC 208 subtracts a fixed amount of charge from capacitor C2 and consequently brings the voltage at switched-capacitor integrator 204 output above comparator 205 reference voltage level causing the comparator output to return to logic 0. From this point on, the charge on C2 will continue to accumulate (in the positive direction) until the next time comparator 205 output is logic 1. Feedback-DAC 208 performs charge subtraction by forcing a voltage change equal to −Vref at the positive terminal of capacitor C4 while capacitor C2 is connected. This operation is realized by first closing switch S9 and opening switch S8 during Φ1 and then opening switch S9 and closing switch S8 during Φ2. When no charge transfer is performed, switch S9 is always open and switch S8 is always closed.

In the negative phase when enough charge is accumulated (in the negative direction) on C3, switched-capacitor integrator 204 output voltage jumps above comparator 205 reference voltage level causing comparator 205 to output logic 0. When this happens feedback-DAC 208 adds a fixed amount of charge to capacitor C3 and consequently brings the voltage at switched-capacitor integrator 204 output below comparator 205 reference voltage level causing the comparator output to return to logic 1. From this point on, the charge on C3 will continue to accumulate (in the negative direction) until the next time comparator 205 output is logic 0. Feedback-DAC 208 performs charge addition by forcing a voltage change equal to Vref at the positive terminal of capacitor C4 while capacitor C3 is connected. This operation is realized by first closing switch S8 and opening switch S9 during Φ1 and then opening switch S8 and closing switch S9 during Φ2. When no charge transfer is performed, switch S9 is always open and switch S8 is always closed.

Whenever charge is subtracted from capacitor C2 or added to capacitor C3 using the feedback-DAC 208, the accumulator 207 increments by one to keep track the total amount of charge moved by feedback-DAC 208. Digital logic 206 ensures a logic 1 is presented at accumulator 207 input whenever feedback-DAC 208 moves charge. At the end of every conversion cycle, accumulator 207 output is the digital equivalent of the average capacitance presented by sensor 202 during that conversion cycle. The exact sensor 202 capacitance value is calculated as the actual accumulator output at the end of the conversion cycle divided by the accumulator output that would result had it been incrementing every clock period during the entire conversion cycle, multiplied by the capacitance value of the feedback-DAC 208 capacitor C4. After the completion of each conversion cycle and before starting the next one, accumulator 207 and switched-capacitor integrator 204 are always reset. Resetting switched-capacitor integrator 204 comprises closing switches S3-S7 simultaneously to remove charges stored on capacitors C2 and C3.

Figure 3:
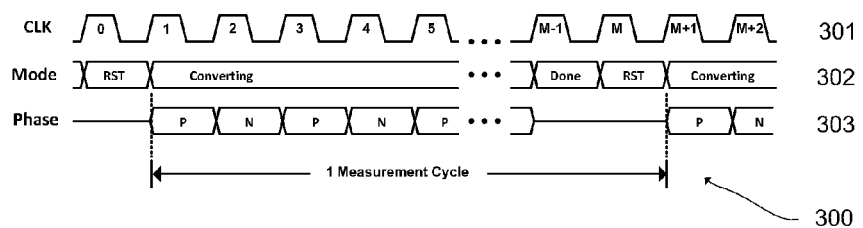
FIG. 3 illustrates a timing diagram for the FIG. 2 embodiment of the mutual capacitive touch sensor.

FIG. 3 illustrates an example timing diagram 300 associated with FIG. 2 circuit 200. Timing diagram 300 includes various timing cycles including clock 301, mode 302 and phase 303. Starting with clock cycle 1, "converting period" includes a series of alternating positive (P) and negative (N) cycles during which charge transfer between sensor 202 and switched-capacitor integrator 204 occur. The cycles continue to transfer charge between sensor 202 and switched-capacitor integrator 204 until the capacitance conversion (converting cycle) is completed and the mode is changed to clear (reset (RST)) charge held by switched-capacitor integrator 204 capacitors and set accumulator 207 output to logic 0. The non-overlapping clock phases Φ1 and Φ2 use in circuit 200 are derived from clock 301, where Φ1 is in phase with clock 301 and Φ2 is 180° out of phase with clock 301.

Figure 4:
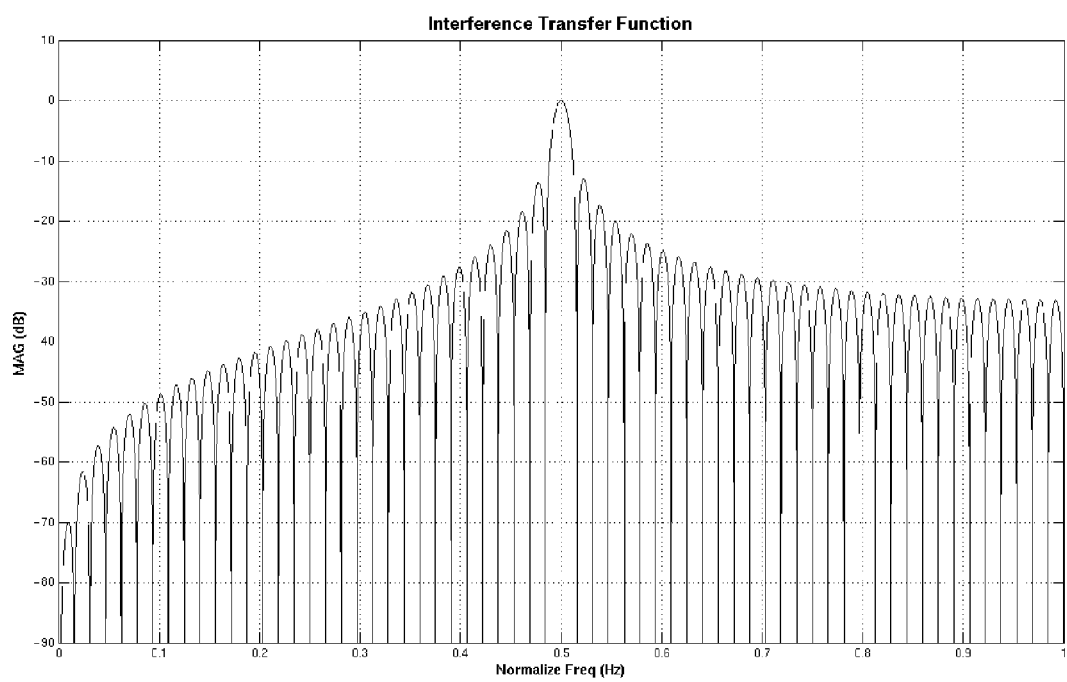
FIG. 4 illustrates an interference transfer function for one embodiment of the technology described herein.

FIG. 4 illustrates an example interference transfer function associated with FIG. 2 and FIG. 3. A pass-band is located around the driving signal frequency (0.5 Hz normalized). In the stop-band, the notch-envelope near DC rolls off towards negative infinity and settles to a finite value near clock 301 frequency (1 Hz normalized). The pass-band width, stop-band attenuation, and notch spacing depend on the total number of clock cycles 301 used for conversion which determines the system impulse response length and therefore the scaling of the interference transfer function in the frequency domain. Any interferer located outside of the pass-band is attenuated to the extent given by the transfer function. Interference inside the pass-band may also be mitigated by moving the pass-band away from the interfering frequency once in-band interference is detected.

While not shown, circuit 200, in one embodiment, is operated in a similar manner to sense in-band interference levels (peak baseline interference). However, different than normal operation, the touch sensor capacitor 202 is not driven (i.e., the output of driver 201 is connected to ground or Vref). The interference pass-band depends both on clock 301 frequency and the pattern with which phase cycle 303 changes between positive (P) and negative (N). While in FIG. 3 phase 303 alternates between P and N every clock cycle, other patterns are considered within the scope of the technology described herein.

Figure 5:
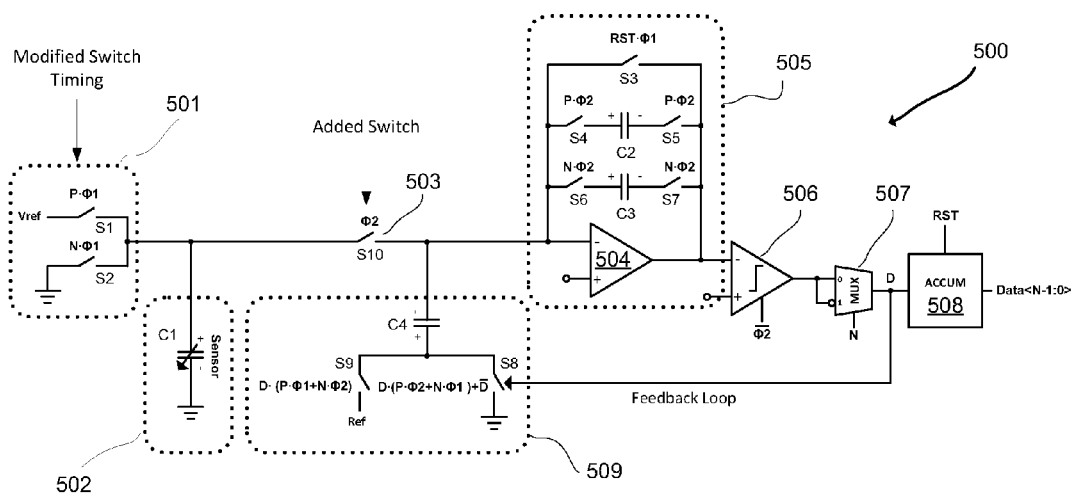
FIG. 5 illustrates a circuit layout for one embodiment of the self-capacitive touch sensor.

FIG. 5 illustrates an alternative embodiment circuit layout 500 for a self-capacitive touch sensor. The circuit layout accomplishes self-capacitive touch sensing and interference rejection using a minimal amount of circuitry and digital logic. In particular, a circuit layout is shown that includes driver circuit 501 using, for example, a square wave with modified timing (as compared to FIG. 2) for reference switch S1 and grounded switch S2. Driver circuit 501 is connected to self-capacitive touch sensor 502 including at least grounded variable capacitor C1. Charge transfer between self-capacitive touch sensor 502 and switched-capacitor integrator 505 passes through added switch S10 (503). Self-capacitive touch sensor 502 is connected as the input capacitor to switched-capacitor integrator 505. Charge transfer between self-capacitive touch sensor 502 and switched-capacitor integrator 505 occur every clock period during a conversion cycle (i.e., multiple clock periods) and alternates in phase between positive (P) and negative (N) from one clock period to another.

In the positive phase, switching of switches S1 and S10 cause voltage on the positive terminal of self-capacitive touch sensor 502 to change by −Vref/2 while capacitor C2 is connected across the inverting and output terminals of operational amplifier 504, thereby forcing charge to flow from self-capacitive touch sensor 502 into capacitor C2. To affect the voltage change, first switch S1 is closed and switch S10 is opened during Φ1 forcing voltage across self-capacitive touch sensor 502 to be Vref, then switch S1 is opened and S10 is closed during Φ2 forcing voltage across self-capacitive touch sensor 502 to settle towards Vref/2 (the voltage at the non-inverting input of operational amplifier 504). Capacitor C2 is connected across operational amplifier 504 by closing switches S4 and S5 during Φ2. During Φ1 switches S4 and S5 are open, and to maintain virtual ground at the inverting input of amplifier 504, switch S3 is always closed during Φ1. The remaining switched-capacitor integrator 505 switches S6 and S7 are always open in the positive phase because capacitor C3 is used only in the negative phase. Each time a charge transfer occurs, the voltage across capacitor C2 increases (i.e., more positive) which in turn causes switched-capacitor integrator 505 output voltage to drop towards the negative supply. Over the duration of a conversion cycle, as charge transfers occur repeatedly, switched-capacitor integrator 505 output voltage will ramp-down towards the negative supply during the positive phase.

Relative to the positive phase, charge transfer happens in the reverse direction during the negative phase. Here, switching of switches S2 and S10 cause voltage at the positive terminal of self-capacitive touch sensor 502 to change by Vref/2 while capacitor C3 is connected across the inverting and output terminals of operational amplifier 504, thereby forcing charge to flow from capacitor C3 into self-capacitive touch sensor 502. To affect the voltage change, first switch S2 is closed and S10 is opened during Φ1 forcing the voltage across self-capacitive touch sensor 502 to 0, then switch S2 is open and switch S10 is closed during Φ2 forcing the voltage across self-capacitive touch sensor 502 to settle towards Vref/2 (the voltage at the non-inverting input of amplifier 504). Capacitor C3 is connected across operational amplifier 504 by closing switches S6 and S7 during Φ2. During Φ1 switches S6 and S7 are open, and to maintain virtual ground at the inverting input of amplifier 504, switch S3 is always closed during Φ1. The remaining switched-capacitor integrator 505 switches S4 and S5 are always open in the negative phase because capacitor C2 is used only in the positive phase. Each time a charge transfer occurs, the voltage across capacitor C3 decreases (i.e., more negative) which in turn causes switched-capacitor integrator 505 output voltage to jump-up towards the positive supply. Over the duration of a conversion cycle, as charge transfers occur repeatedly, switched-capacitor integrator 505 output voltage will ramp-up toward the positive supply during the negative phase.

Comparator 506 is used to determine whether charge held in capacitors C2 or C3 has exceeded a predetermined threshold. In operation, comparator 506 outputs logic 1 if switched-capacitor integrator 505 output voltage at the end of Φ2 is greater than a reference level, and logic 0 otherwise. During the positive phase when enough charge is accumulated (in the positive direction) on C2, switched-capacitor integrator 505 output voltage drops below comparator 506 reference voltage level causing comparator 506 to output logic 1. When this happens feedback-DAC 509 subtracts a fixed amount of charge from capacitor C2 and consequently brings the voltage at switched-capacitor integrator 505 output above comparator 506 reference voltage level causing comparator output to return to logic 0. From this point on, the charge on C2 will continue to accumulate (in the positive direction) until the next time comparator 506 output is logic 1. Feedback-DAC 509 performs charge subtraction by forcing a voltage change equal to −Vref at the positive terminal of capacitor C4 while capacitor C2 is connected. This operation is realized by first closing switch S9 and opening switch S8 during Φ1 and then opening switch S9 and closing switch S8 during Φ2. When no charge transfer is performed, switch S9 is always open and switch S8 is always closed.

In the negative phase when enough charge is accumulated (in the negative direction) on C3, switched-capacitor integrator 505 output voltage jumps above comparator 506 reference voltage level causing comparator 506 to output logic 0. When this happens, feedback-DAC 509 adds a fixed amount of charge to capacitor C3 and consequently brings the voltage at switched-capacitor integrator 505 output below comparator 506 reference level causing the comparator output to return to logic 1. From this point on, the charge on C3 will continue to accumulate (in the negative direction) until the next time comparator 506 output is logic 0. Feedback-DAC 509 performs charge addition by forcing a voltage change equal to Vref at the positive terminal of capacitor C4 while capacitor C3 is connected. This operation is realized by first closing switch S8 and opening switch S9 during Φ1 and then opening switch S8 and closing switch S9 during Φ2. When no charge transfer is performed, switch S9 is always open and switch S8 is always closed.

Whenever charge is subtracted from capacitor C2 or added to capacitor C3 using the feedback-DAC 509, the accumulator 508 increments by one to keep track the total amount of charge moved by feedback-DAC 509. Digital logic 507 ensures a logic 1 is presented at accumulator 509 input whenever feedback-DAC 509 moves charge. At the end of every conversion cycle, accumulator 508 output is the digital equivalent of the average capacitance presented by self-capacitive touch sensor 502 during that conversion cycle. The exact self-capacitive touch sensor 502 capacitance value is calculated as the actual accumulator output at the end of the conversion cycle divide by the accumulator output that would result had it been incrementing every clock period during the entire conversion cycle, multiplied by the capacitance value of the feedback-DAC 509 capacitor C4. After the completion of each conversion cycle and before starting the next one, accumulator 508 and switched-capacitor integrator 505 are always reset. Resetting switched-capacitor integrator 505 involves closing switches S3-S7 simultaneously to remove charges stored on capacitors C2 and C3.

Figure 6:
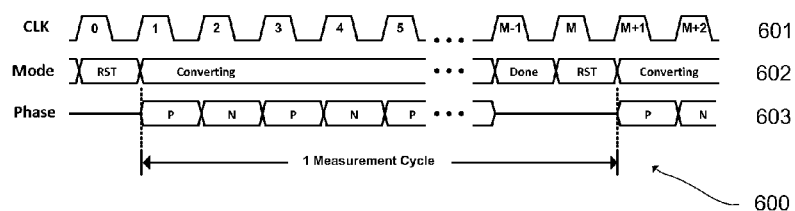
FIG. 6 illustrates a timing diagram for the FIG. 5 embodiment of the self-capacitive touch sensor.

FIG. 6 illustrates an example timing diagram 600 associated with FIG. 5 circuit 500. Timing diagram 600 includes various timing cycles including clock 601, mode 602 and phase 603. Starting with clock cycle 1, "converting period" includes a series of alternating positive (P) and negative (N) cycles during which charge transfer between self-capacitive touch sensor 502 and switched-capacitor integrator 505 occur. The cycles continue to transfer charge between self-capacitive touch sensor 502 and switched-capacitor integrator 505 until capacitance conversion (converting cycle) is completed and the mode is changed to clear (reset(RST)) charge held by switched-capacitor integrator 505 capacitors and set accumulator 508 output to logic 0. The non-overlapping clock phases Φ1 and Φ2 use in circuit 500 are derived from clock 601, where Φ1 is in phase with clock 601 and Φ2 is 180° out of phase with clock 601.

While not shown, circuit 500 may be operated in a similar manner to sense in-band interference levels (peak baseline interference). However, different than normal operation, the self-capacitive touch sensor capacitor 502 is not driven (i.e., the output of driver 501 is connected to ground or Vref). The interference pass-band depends both on clock 601 frequency and the pattern with which phase cycle 603 changes between positive (P) and negative (N). While in FIG. 6 phase 603 alternates between P and N every clock cycle, other patterns are considered within the scope of the technology described herein.

Circuit 200 provided in FIG. 2 can be made to interface with self-cap sensors by changing the operation of switches S1 and S2, and adding switch S10 as show in FIG. 5. To use this circuit with mutual cap sensors, added switch S10 can be held as "always on", and revert the operation of switches S1 and S2 to those shown in FIG. 2 and FIG. 3.

Figure 7:
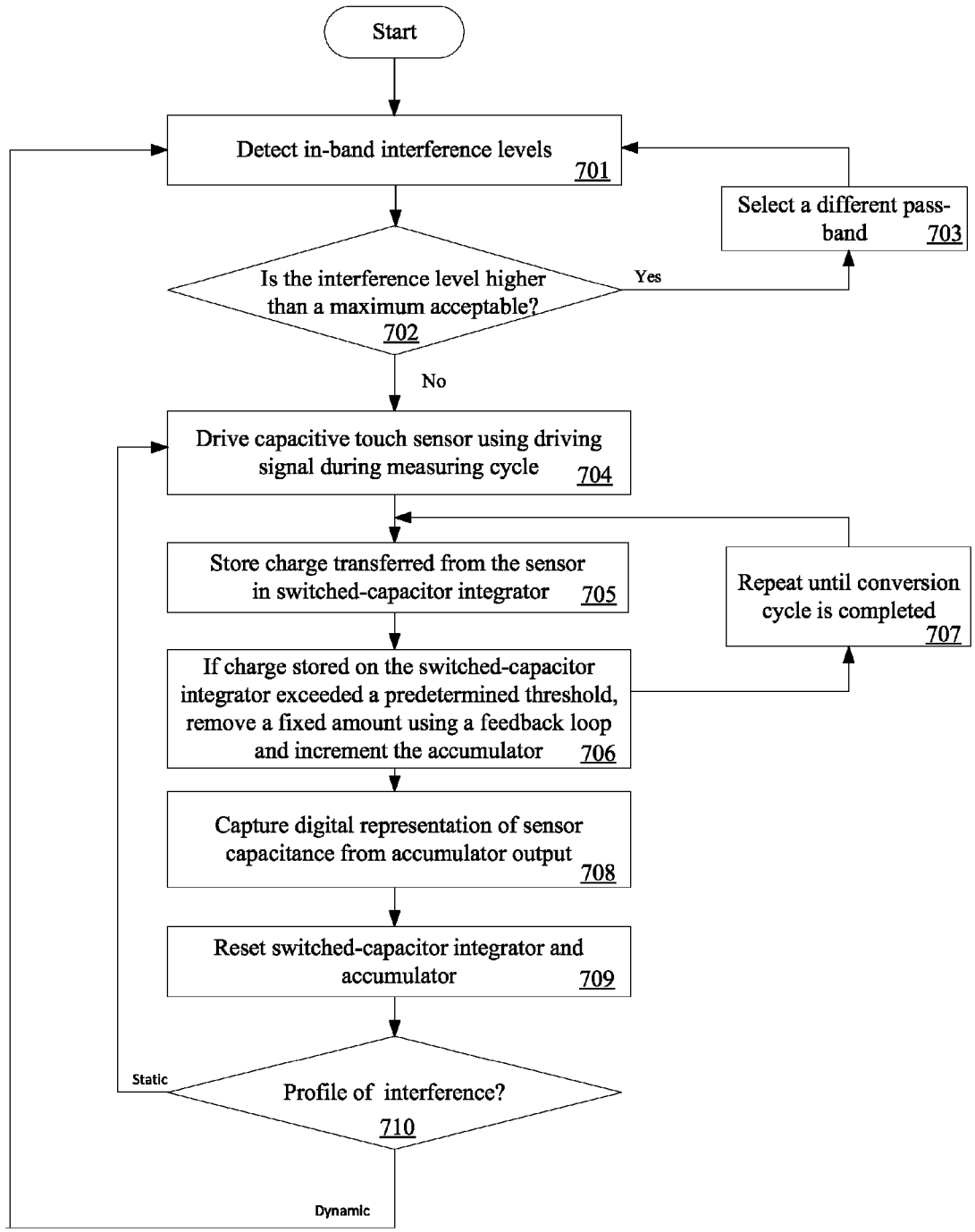
FIG. 7 illustrates steps for capacitive touch sensing of one embodiment of the technology described herein.

FIG. 7 illustrates an embodiment of the technology described within which functions to perform a series of steps to provide improved interference rejection for capacitive touch sensors. In step 701, an in-band interference level is detected by first operating a capacitive touch sensor without a driving signal. In step 702, if the interference level is higher than a maximum acceptable, a different pass-band is selected 703 by changing the system clock frequency (tuning) or altering the phase cycle pattern of 303 and 603. Steps 701, 702, and 703 are repeated until the in-band interference level is sufficiently low. This is possible assuming the interference doesn't continuously jam the entire operating frequency range of the sensor circuit. While steps 701-703 assist in avoiding in-band interference, they can be eliminated if a quality low-interference pass-band is known.

In step 704, the tuned driving signal is used to drive the capacitive touch sensor during a conversion cycle. The driving signal may operate at one fixed or multiple time-multiplexed frequencies to achieve a sufficiently low in-band interference level. In step 705, two capacitors of switched-capacitor integrator alternately store charge transferred from the capacitive touch sensor (depending on direction of current flow). In step 706, if charge stored on at least one of the capacitors of the switched-capacitor integrator exceeds a predetermined threshold, remove a fixed amount using a feedback loop and increment the accumulator. Steps 704-706 are repeated 707 until the conversion cycle is completed. In step 708, a digital representation of the total capacitive touch sensor charge is captured from the accumulator output. In step 709, the capacitors of the switched-capacitor integrator and accumulator are reset in preparation for the next conversion cycle. In step 710, if the interference profile is static, then the next conversion cycle begins in step 704. On the other hand, if the interference profile is highly dynamic, the next conversion cycle begins in step 701.

Current embodiments result in improved power efficiency in capacitive touch sensing circuits over the prior art while providing interference rejection. Furthermore, implementation of both self and mutual cap sensing can be achieved with negligible overhead. Being able to sense both self and mutual capacitance makes the touch controller compatible with a larger collection of sensors. Additionally, for mutual capacitive sensing applications, this capability allows the touch controller to capture more information from a touch panel which can be used to provide more functionality or perform diagnostics. Lastly, removing dedicated convertors and digital signal processing circuit elements from prior art capacitive sensor circuits reduces required chip (integrated circuit die) real estate costs and space.

While various embodiments have been provided directed to touch sensor applications, detection of capacitive changes for applications unrelated to touch sensing are considered within the scope of the technology described herein. In addition, the technology described herein can be used for high resolution, low bandwidth analog-to-digital convertors.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship.

The technology as described herein has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the technology as described herein have been expressly described herein, other combinations of these features and functions are likewise possible. The technology as described herein is not limited by the particular examples disclosed herein and expressly incorporates these other combinations.

The invention claimed is:

1. A method of sensing capacitance of a capacitive touch sensor and rejecting interference coupled-in through the capacitive touch sensor during a conversion cycle, the method comprising:
   generating a driving signal, the driving signal driving the capacitive touch sensor during the conversion cycle;
   alternately storing charge transferred from the capacitive touch sensor to a switched-capacitor integrator during the conversion cycle;
   recording total charge accumulated in the switched-capacitor integrator during the conversion cycle; and
   wherein the recording step further includes modifying the switched-capacitor integrator by a fixed amount of charge using a feedback loop after charge stored in at least one capacitor of the switched-capacitor integrator exceeds a threshold level.

2. The method of sensing capacitance of a capacitive touch sensor and rejecting interference coupled-in through the touch sensor during a conversion cycle of claim 1, wherein the recording step further includes detecting an amount of charge stored in the at least one capacitor of the switched-capacitor integrator by comparing the switched-capacitor integrator output voltage to the threshold level.

3. The method of sensing capacitance of a capacitive touch sensor and rejecting interference coupled-in through the touch sensor during a conversion cycle of claim 1, wherein the recording step further includes accumulating a number of times the charge is modified using the feedback loop.

4. The method of sensing capacitance of a capacitive touch sensor and rejecting interference coupled-in through the touch sensor during a conversion cycle of claim 1, wherein the driving signal switches in one fixed or multiple time-multiplexed patterns for modulating current flow from the capacitive touch sensor to the switched-capacitor integrator.

5. The method of sensing capacitance of a capacitive touch sensor and rejecting interference coupled-in through the touch sensor during a conversion cycle of claim 4, wherein the driving signal is tuned to avoid detected in-band interference by operating at one fixed or multiple time-multiplexed frequencies outside bands where the interference level is unacceptable.

6. The method of sensing capacitance of a capacitive touch sensor and rejecting interference coupled-in through the touch sensor during a conversion cycle of claim 5, wherein interference signals located outside of the pass-band of the tuned driving signal are attenuated.

7. The method of sensing capacitance of a capacitive touch sensor and rejecting interference coupled-in through the touch sensor during a conversion cycle of claim 1, wherein charge transferred from the capacitive touch sensor to the switched-capacitor integrator is stored in one of two capacitors of the switched-capacitor integrator depending on a positive/negative direction of current flow from the capacitive touch sensor to the switched-capacitor integrator.

8. The method of sensing capacitance of a capacitive touch sensor and rejecting interference coupled-in through the touch sensor during a conversion cycle of claim 1, wherein the capacitive touch sensor is either a mutual capacitance sensor or a self-capacitance sensor.

9. A circuit for sensing capacitance of a capacitive touch sensor and rejecting interference coupled-in through the capacitive touch sensor during a conversion cycle, the circuit comprising:
- a driving signal generator,
- a capacitive touch sensor, an output of the driving signal generator fed to an input of the capacitive touch sensor;
- a switched-capacitor integrator connected to an output of the capacitive touch sensor;
- a comparator connected to an output of the switched-capacitor integrator to detect charge exceeding a threshold level;
- a feedback circuit operatively connected to an output of the comparator and an input of the switched-capacitor integrator, wherein, when the charge exceeds the threshold level, the feedback circuit includes modifying the switched-capacitor integrator by a fixed amount of charge using a feedback loop; and
- an accumulator operatively connected to an output of the comparator to record total charge moved by the feedback circuit during the conversion cycle.

10. The circuit for sensing capacitance of a capacitive touch sensor and rejecting interference coupled-in through the touch sensor during a conversion cycle of claim 9, wherein the driving signal generator comprises alternate phase operations of a reference voltage through a switch S1 and ground through a switch S2.

11. The circuit for sensing capacitance of a capacitive touch sensor and rejecting interference coupled-in through the touch sensor during a conversion cycle of claim 9, wherein the driving signal comprises a square wave.

12. The circuit for sensing capacitance of a capacitive touch sensor and rejecting interference coupled-in through the touch sensor during a conversion cycle of claim 9, wherein the switched-capacitor integrator comprises a positive cycle branch having a first capacitor with two positive cycle switches (S4 and S5) set to close during a positive cycle of the driving signal to collect capacitive touch sensor charge in the first capacitor; a negative cycle branch having a second capacitor and two switches (S6 and S7) set to close during a negative cycle of the driving signal to collect capacitive touch sensor charge in the second capacitor, and an operational amplifier to provide gain.

13. The circuit for sensing capacitance of a capacitive touch sensor and rejecting interference coupled-in through the touch sensor during a conversion cycle of claim 9, wherein the feedback loop includes a feedback digital to analog converter (DAC) comprising at least a third capacitor and a set of driving signal controlled switches (S8 and S9).

14. The circuit for sensing capacitance of a capacitive touch sensor and rejecting interference coupled-in through the touch sensor during a conversion cycle of claim 9, wherein the capacitive touch sensor is either a mutual capacitive touch sensor or a self-capacitive touch sensor.

15. The circuit for sensing capacitance of a capacitive touch sensor and rejecting interference coupled-in through the touch sensor during a conversion cycle of claim 14, wherein the circuit further comprises a switch (S10) inserted between the capacitive touch sensor and the switched-capacitor integrator to enable use of either of the mutual capacitive touch sensor or the self-capacitive touch sensor.

16. The circuit for sensing capacitance of a capacitive touch sensor and rejecting interference coupled-in through the touch sensor during a conversion cycle of claim 9, wherein the driving signal generator switches at one fixed or multiple time-multiplexed frequencies outside bands where a level of the interference is unacceptable.

17. A circuit for sensing capacitance of a capacitive touch sensor and rejecting interference coupled-in through the capacitive touch sensor during a conversion cycle, the circuit comprising:
- a driving signal generator comprising multiple modes;
- a capacitive touch sensor, the capacitive touch sensor comprising either a mutual capacitive touch sensor or a self-capacitive touch sensor, an output of the driving signal generator operatively fed to an input of the capacitive touch sensor;
- a switched-capacitor integrator connected to an output of the capacitive touch sensor;
- a switch inserted between the capacitive touch sensor and the switched-capacitor integrator to sense either a mutual capacitive touch sensor in a first of the multiple modes or a self-capacitive touch sensor in a second of the multiple modes;
- a comparator connected to an output of the switched-capacitor integrator to detect charge exceeding a threshold level;
- a feedback circuit operatively connected to an output of the comparator and an input of the switched-capacitor integrator to modify charge from the switched-capacitor integrator when the threshold level is exceeded; and
- an accumulator operatively connected to an output of the comparator to record total charge removed by the feedback circuit during the conversion cycle.

18. The circuit for sensing capacitance of a capacitive touch sensor and rejecting interference coupled-in through the touch sensor during a conversion cycle of claim 17, wherein the feedback circuit comprises a feedback loop, the feedback loop including a feedback digital to analog converter (DAC) comprising at least a third capacitor and a set of driving signal controlled switches and wherein the feedback circuit includes modifying the charge by a fixed amount from the switched-capacitor integrator using the feedback loop the threshold level is exceeded.

* * * * *